United States Patent [19]

Nakata

[11] Patent Number: 5,337,157
[45] Date of Patent: Aug. 9, 1994

[54] COPY GUARD PROCESSING DETECTING APPARATUS

[75] Inventor: Shingo Nakata, Kanagawa, Japan

[73] Assignee: Sony Corporation, Tokyo, Japan

[21] Appl. No.: 4,942

[22] Filed: Jan. 15, 1993

[30] Foreign Application Priority Data

Jan. 16, 1992 [JP] Japan .................................. 4-025725

[51] Int. Cl.$^5$ ............................................. H04N 5/91
[52] U.S. Cl. ...................................... 358/335; 380/5; 360/37.1; 348/533
[58] Field of Search ............... 358/335, 319, 148, 153, 358/155, 147; 380/5, 15; 360/37.1, 13, 15, 60; H04N 5/91

[56] References Cited

U.S. PATENT DOCUMENTS

| | | | |
|---|---|---|---|
| 4,792,852 | 12/1988 | Narusawa | 358/154 |
| 4,870,297 | 9/1989 | Karlock | 358/153 |
| 4,907,093 | 3/1990 | Ryan | 358/335 |
| 4,937,679 | 6/1990 | Ryan | 358/335 |
| 4,951,315 | 8/1990 | Switsen | 358/153 |
| 5,034,981 | 7/1991 | Leonard | 380/5 |
| 5,133,008 | 7/1992 | Fujita | 380/5 |

FOREIGN PATENT DOCUMENTS

| | | | |
|---|---|---|---|
| 224929 | 6/1987 | European Pat. Off. | H04N 5/91 |
| 238287 | 9/1989 | Japan | H04N 5/91 |
| 4368083 | 12/1992 | Japan | H04N 5/91 |

*Primary Examiner*—James J. Groody
*Assistant Examiner*—Chris Grant
*Attorney, Agent, or Firm*—Lewis H. Eslinger; Jay H. Maioli

[57] ABSTRACT

A copy guard processing detecting apparatus which can correctly judge whether or not a copy guard is applied to an input video signal and prevents copy guard processing from being applied to a video signal to which a copy guard is not applied. The copy guard processing detecting apparatus comprises a first circuit for receiving an input video signal which includes a plurality of false synchronizing signals for prevention of duplication inserted in a vertical blanking interval thereof and for counting the number of the false synchronizing signals, a second circuit for counting the number of synchronizing signals in an image interval of the input video signal except the vertical blanking interval, and a discriminator for discriminating whether or not copy guard processing is applied to the input video signal from the count values of the first and second circuits.

4 Claims, 4 Drawing Sheets

COPY GUARD PROCESSING DETECTING APPARATUS

BACKGROUND OF THE INVENTION

1. Field of the Invention

This invention relates to a copy guard processing detecting apparatus for detecting whether or not a video signal of a recorded video tape on which a piece of video software such as a motion picture is recorded is processed for prevention of duplication of itself.

2. Description of the Related Art

It is a popular practice, in order to make it substantially impossible to copy or duplicate a recorded tape, on which a piece of video software such as a motion picture is recorded, by means of a video tape recorder for home use, to apply some processing to the recorded video signal for prevention of duplication of the signal itself (such processing will be hereinafter referred to as copy guard).

An exemplary one of conventional copy guard methods is disclosed in Japanese Patent Laid-Open Application No. 61-288582 and is popularly used. According to the method, a plurality of pairs of pulses each including a false synchronization pulse and a positive pulse are inserted in each vertical blanking interval, and an AGC (automatic gain control) circuit of the recording system of a predetermined characteristic is utilized for processing for coping with a copy guard. The reason why a signal for a copy guard is inserted in a vertical blanking interval is that the signal for a copy guard may possibly have a bad influence on contents themselves of a piece of video software otherwise if it is inserted directly into an image signal interval.

FIG. 4 illustrates the copy guard method disclosed in the document mentioned above. The waveform B in FIG. 4 shows an example of a video signal wherein a plurality of pairs of pulses each including a false synchronization pulse and a positive pulse for a copy guard (such pairs of pulses will be hereinafter referred to as copy guard signal) are inserted in a vertical blanking interval. Meanwhile, the waveform A in FIG. 4 shows another video signal which does not include such pulses inserted therein. In the video signal shown by the waveform of FIG. 4, five pairs of pulses each including a false synchronization pulse DP and a positive pulse LP are inserted for each fixed period in each of horizontal intervals from the thirteenth to eighteenth horizontal intervals in a vertical blanking interval of an odd-numbered field.

It is to be noted that, in the case of the video signal shown by the waveform B of FIG. 4, though not shown, another copy guard signal is inserted similarly between the 275th to 280th horizontal intervals of an even-numbered field.

In the video signal of the waveform B of FIG. 4, a rising edge of a false synchronization pulse DP continues to a rising edge of a next positive pulse LP, and accordingly, if the copy guard signal is inserted in the video signal, an AGC circuit of the recording system of a video tape recorder will determine that a synchronization pulse has a magnitude equal to the magnitude from a peak value of the false synchronization pulse DP to a peak value of the positive pulse LP and accordingly will effect gain control as if the level of the input video signal is as high as, for example, three times or more a standard level. Consequently, if the recorded signal is reproduced, then since it has been attenuated to a level equal to or less than 30% of the standard level, only an unstable image of a low quality can be obtained. In other words, a copy guard can substantially be achieved.

Also it is a common practice to change the level of such positive pulses LP suitably to change the AGC level to various values in order to further deteriorate the quality of the reproduced image.

Since the conventional copy guard coping processing relies on a peculiar characteristic of an AGC circuit of a video tape recorder with regard to an external input, the copy guard function cannot sometimes be obtained sufficiently depending upon the type, the characteristic or the performance of the AGC circuit.

Further, since the conventional copy guard method does not cause the AGC circuit to operate in accordance with a result of judgment whether or not a copy guard is actually applied to a video signal, it has a drawback that the AGC circuit reacts with a noise which is generated when, for example, tracking is lost or variable speed reproduction is performed with the video tape recorder or with some other disturbance noise taking the noise as a false pulse so that the video signal to be recorded is deteriorated to a low quality although the video signal is originally a normal video signal.

The drawback arises from the fact that the copy guard coping processing function is normally put into an operating condition whether or not a copy guard is applied to a video signal.

SUMMARY OF THE INVENTION

It is an object of the present invention to provide a copy guard processing detecting apparatus which can correctly judge whether or not a copy guard is applied to an input video signal.

It is another object of the present invention to provide a copy guard processing detecting apparatus which prevents processing for coping with a copy guard from being applied to a video signal to which a copy guard is not applied.

In order to attain the objects, according to the present invention, there is provided a copy guard processing detecting apparatus, which comprises first means for receiving an input video signal which includes a plurality of false synchronizing signals for prevention of duplication inserted in a vertical blanking interval thereof and for counting the number of the false synchronizing signals, second means for counting the number of synchronizing signals in an image interval of the input video signal except the vertical blanking interval, and discriminating means for discriminating whether or not copy guard processing is applied to the input video signal from the count values of the first and second means.

With the copy guard processing detecting apparatus, the discriminating means discriminates that a copy guard is applied correctly to the input video signal when the count value of the second means indicates that no noise is included in the image interval of the input video signal and the count value of the first means indicates that copy guard processing is applied to the input video signal.

In particular, even if the count value of the first means indicates that a number of pulses greater than a number determined in advance for false synchronizing signals are involved in the vertical blanking interval of the input video signal and accordingly copy guard processing is applied to the input video signal, when the count value of the second means indicates that noises are involved in the image interval so that a number of synchronizing pulses greater than a predetermined number are involved in the image interval, the discriminating means determines that a copy guard is not applied to the input video signal. This is because the probability is high that the false synchronizing pulses detected as copy guard signals in the vertical blanking interval are not copy guard pulses but are noises.

Accordingly, with the copy guard processing detecting apparatus, since presence of false synchronizing pulses for a copy guard inserted in a vertical blanking interval is detected to detect whether or not copy guard processing is applied to the video signal, appropriate copy guard coping processing can be applied to the video signal and also to an incidental audio signal using the detection output of the copy guard processing detecting apparatus.

Furthermore, since whether or not copy guard processing is applied to a video signal is detected not only by detection of presence of false synchronization pulses in a vertical blanking interval but also by checking the number of synchronizing pulses in an image portion interval to detect whether or not the false synchronizing signals in the video blanking interval of the video signal are noises which are generated upon variable speed reproduction of the video tape recorder or the like, presence or absence of copy guard processing can be detected accurately.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
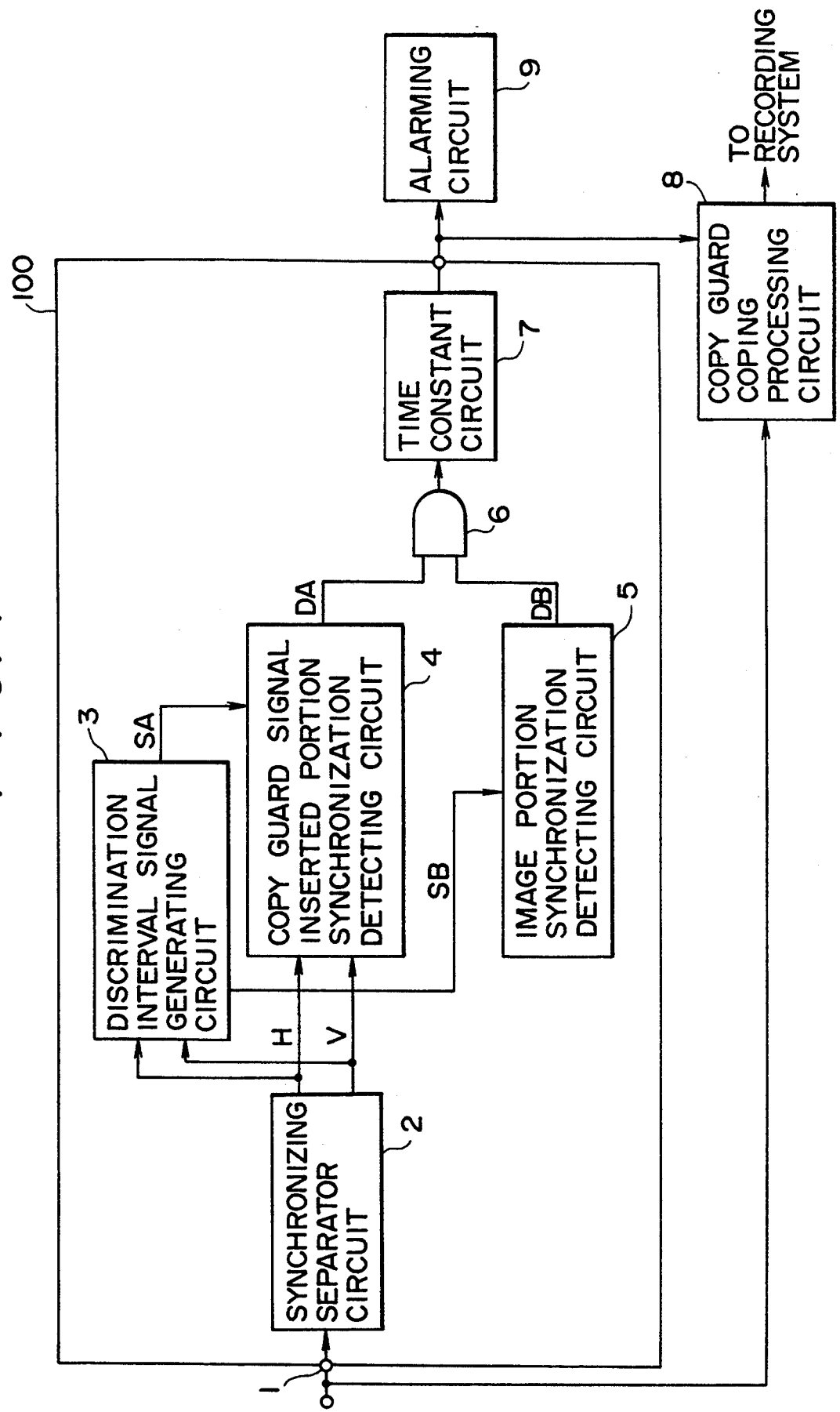
FIG. 1 is a block diagram of a copy guard processing detecting apparatus showing a preferred embodiment of the present invention.

Referring first to FIG. 1, there is shown a copy guard processing detecting apparatus to which the present invention is applied. The copy guard processing detecting apparatus shown is generally denoted at 100 and has an input terminal 1. A video signal inputted to the apparatus 100 by way of the input terminal 1 is supplied to a synchronizing separator circuit 2, from which a horizontal synchronizing signal H and a vertical synchronizing signal V are obtained. The synchronizing signals H and V are supplied to a discrimination interval signal generating circuit 3 for the number of horizontal synchronizing pulses, a copy guard signal inserted portion synchronization detecting circuit 3, and an image portion synchronization detecting circuit 5.

Figure 2:
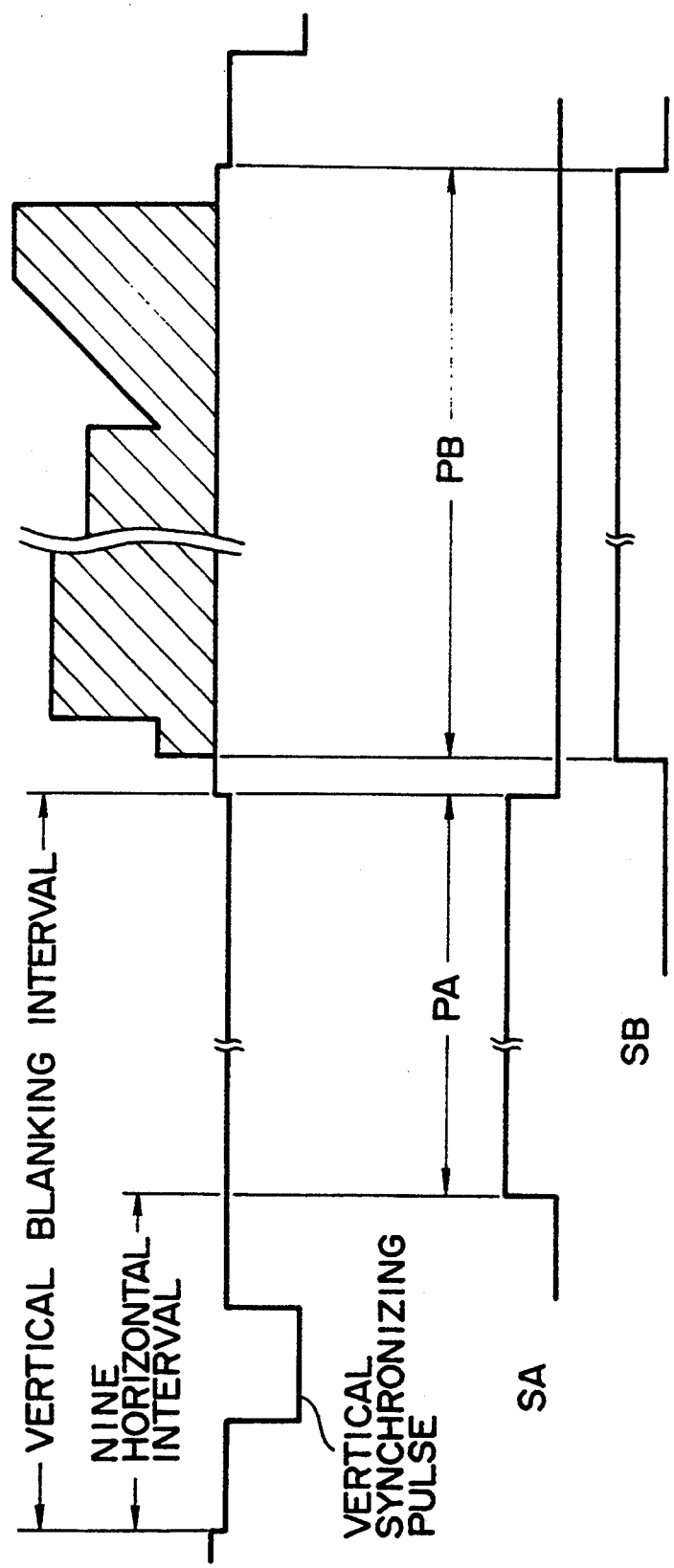
FIG. 2 is a waveform diagram illustrating operation of the copy guard processing detecting apparatus of FIG. 1.

The discrimination interval signal generating circuit 3 produces, from the horizontal synchronizing signal H and the vertical synchronizing signal V, as shown in FIG. 2, a window pulse SA which presents, for example, the high level only for an interval (into which a copy guard signal can be inserted) PA within a vertical blanking interval except 9 horizontal intervals including equalizing pulse intervals and a vertical synchronizing pulse interval, and another window pulse SB which presents the high level only for an image portion interval PB except a vertical blanking interval.

For example, in the case of an odd-numbered field of a video signal of the NTSC system, the interval PA includes the 10th to 21st horizontal intervals while the interval PB includes, for example, the 22nd to 263rd horizontal intervals. On the other hand, in the case of an even-numbered field, the interval PA includes the 272nd to 283rd horizontal intervals while the interval PB includes, for example, the 284th to 525th horizontal intervals.

The window pulse SA is supplied to the copy guard signal inserted portion synchronization detecting circuit 4, at which the numbers of synchronizing pulses are counted for the interval PA. The copy guard signal inserted portion synchronization detecting circuit 4 can be constructed, for example, from a counter and a discriminating section which makes such a discrimination as will be hereinafter described in accordance with an output count value of the counter, or alternatively may be constructed from a microcomputer.

In this instance, since the interval PA has the width of eleven horizontal intervals, if no copy guard signal is inserted in the video signal, then normally eleven synchronizing pulses are detected. However, taking an error of the circuit system, a damage to the tape and so forth into consideration, a margin $\alpha 1$ is set for the detected number of horizontal synchronizing pulses. The value of the margin may range, for example, $\alpha 1 = 2$ to 4.

When the detected number N of synchronization pulses is $N \leq 11 + \alpha 1$, the copy guard signal inserted portion synchronization detecting circuit 4 determines that the input video signal includes no copy guard signal, and puts the output DA thereof into a low level. On the other hand, if the detected number N of synchronizing pulses is $N > 11 + \alpha 1$, then the copy guard signal inserted portion synchronization detecting circuit 4 determines that the input video signal includes a copy guard signal, and puts the output DA thereof into a high level. The state of the output DA of the circuit 4 is maintained for the interval of one field. Accordingly, if the determination for a certain field is the same as that for the preceding field, then the state of the output DA maintains the condition then, but when the determination is different from that for the preceding field, then the state of the output DA is reversed.

On the other hand, the pulse SB from the discrimination interval signal generating circuit 3 is supplied to the image portion synchronization detecting circuit 5, at which the numbers of synchronizing pulses are counted for the interval PB. Also the image portion synchronization detecting circuit 5 can be constructed from a counter and a discriminating section which makes such a discrimination as will be hereinafter described in accordance with an output count value of the counter, or alternatively may be constructed from a microcomputer.

In this instance, since the interval PB has the width of 241 horizontal intervals, if no noise or no dropout is included in the video signal, then normally 241 synchronizing pulses are detected. However, taking an error of the circuit system, a damage to the tape and so forth into consideration, a margin $\alpha2$ is set for the detected number of horizontal synchronizing pulses. The value $\alpha2$ of the margin may be set, for example, to ten or more or so.

When the detected number M of synchronization pulses is $241-\alpha2 \leq M \leq 241+\alpha2$, the image portion synchronization detecting circuit 5 determines that the input video signal includes no noise and is normal, and puts the output DB thereof into the high level. On the other hand, if the detected number M of synchronizing pulses is $M>241+\alpha2$ or $M<241\alpha2$, then the image portion synchronization detecting circuit 5 determines that the input video signal includes a noise and is not a normal video signal, and puts the output DB thereof into the low level. The state of the output DB of the circuit 5 is maintained for the interval of one field. Accordingly, if the determination for a certain field is the same as that for the preceding field, then the state of the output DB maintains the condition then, but when the determination is different from that for the preceding field, then the state of the output DB is reversed.

The output DA of the copy guard signal inserted portion synchronization detecting circuit 4 and the output DB of the image portion synchronization detecting circuit 5 are supplied to an AND circuit 6. Accordingly, when the input video signal has a normal image portion and a copy guard signal is involved in the interval PA, the output of the AND circuit 6 presents the high level, but in any other case, the output presents the low level.

The output of the AND circuit 6 is supplied to a chattering preventing time constant circuit 7. The time constant circuit 7 is provided to make detection of a copy guard sure and outputs an output DET which presents, for example, the high level when the output of the AND circuit 6 maintains the high level condition continuously for, for example, 30 to 90 seconds. The output DET of the time constant circuit 7 makes the output of the copy guard processing detecting circuit 100.

In response to the output DET, copy guard coping processing is performed for the input video signal. In particular, the input video signal is supplied to a copy guard coping processing circuit 8 while also the output DET of the copy guard processing detecting apparatus 100 is supplied to the copy guard coping processing circuit 8. The copy guard coping processing circuit 8 effects copy guard coping processing for the input video signal only when the output DET presents the high level.

In this instance, the coping processing may be, for example, to mute the input video signal so that the input video signal is prevented from being outputted from the coping processing circuit 8, to attenuate the level of the input video signal, or to apply digital processing so that a regular reproduced image cannot be derived from the input video signal such as mosaic processing. Or otherwise, the video tape recorder may be constructed such that the AGC circuit of the recording system for a video signal is constructed to be changed over between a characteristic wherein the AGC circuit reacts effectively with a copy guard signal and another characteristic wherein the AGC circuit is not influenced by a copy guard signal and is changed over, only when the output DET inputted thereto has the high level, to the characteristic wherein the AGC circuit reacts effectively with a copy guard signal so that an enjoyable reproduced image cannot be obtained. Or Alternatively, the output DET may be used such that the recording mode of the video tape recorder is cancelled when the output DET presents the high level.

Or else, the coping processing may be applied not only to a video signal but also to an audio signal such that, only when the output DET presents the high level, muting processing or such processing as attenuation of the level, addition of noises which makes it difficult to enjoy sound derived from the audio signal, is applied.

Thus, when the output DET of the copy guard processing detecting apparatus 100 presents the low level, the coping processing described above is not performed at the copy guard coping processing circuit 8 and the input video signal is outputted as it is from the circuit 8.

The video signal and the audio signal from the coping processing circuit 8 are supplied, for example, to the recording system of a video tape recorder. Consequently, when the output DET of the copy guard processing detecting apparatus 100 indicates that a copy guard is applied to the input video signal, the video signal and/or the audio signal are prevented from being recorded without any processing applied thereto.

The output DET of the time constant circuit 7 is supplied also to an alarming circuit 9 so that, when it is detected that a copy guard is applied to the input video signal, the alarming circuit 9 notifies the user of this by way of such means as, for example, lighting of an alarming lamp, display by means of a display unit, or generation of alarming sound. The user is thus prevented from mistaking that the video tape recorder fails.

Figure 3:
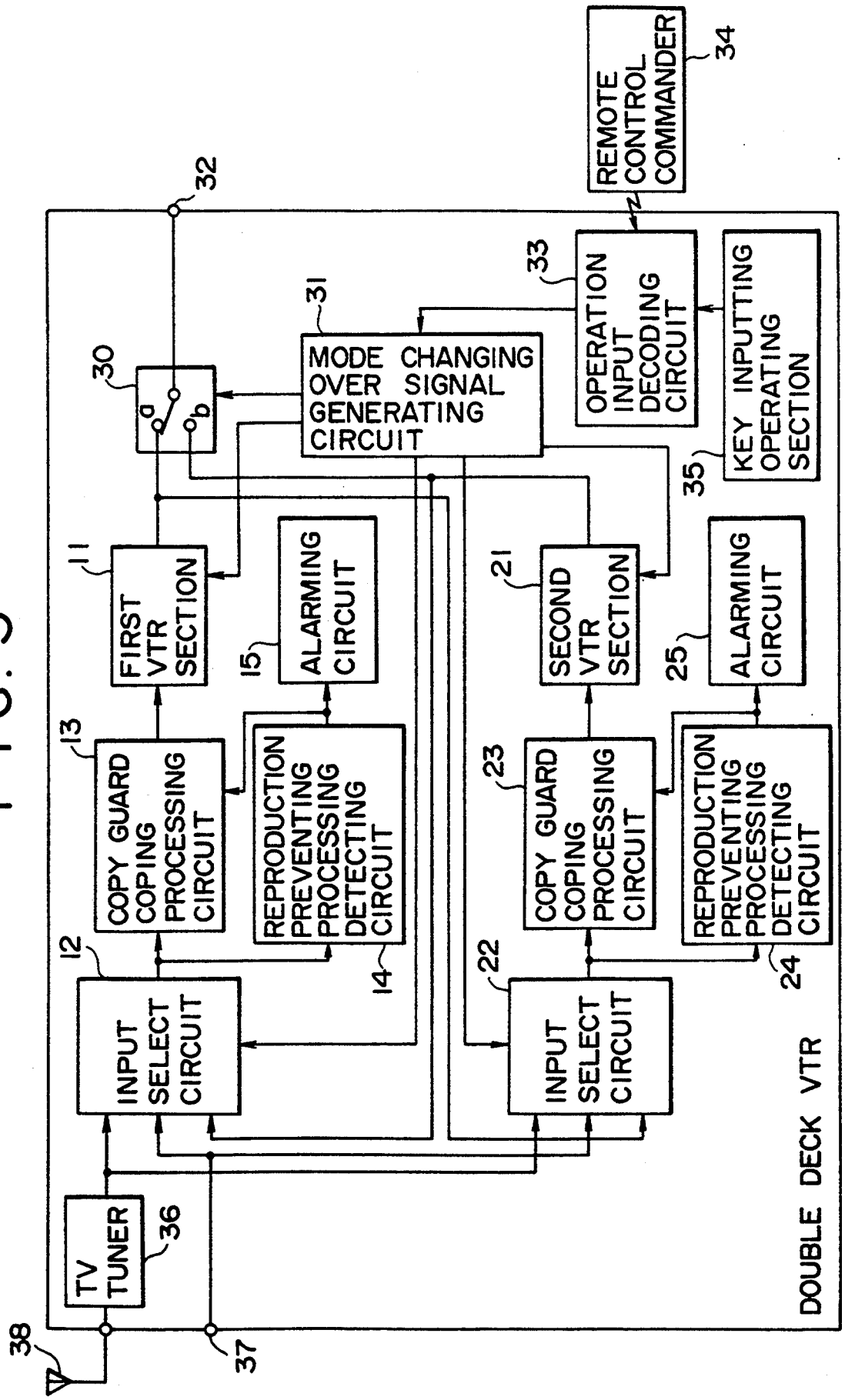
FIG. 3 is a block diagram of a double deck video tape recorder system illustrating an exemplary application of the copy guard processing detecting apparatus shown in FIG. 1.
Figure 4A:
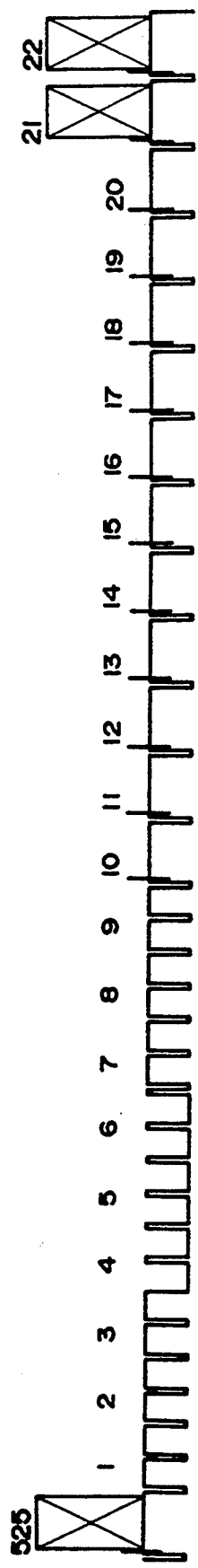
FIG. 4 is a waveform diagram illustrating an example of a signal for copy guard processing.
Figure 4B:
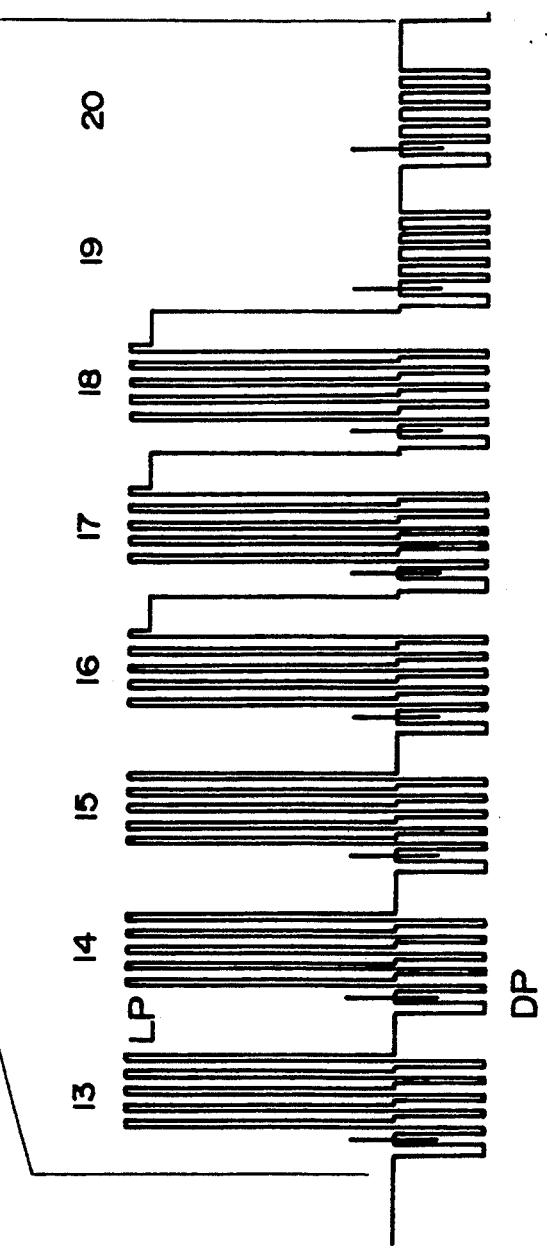

Subsequently, an exemplary application of the copy guard processing detecting apparatus according to the present invention will be described with reference to FIG. 3 in which the copy guard processing detecting apparatus is applied to a double deck video tape recorder system which has functions of two video tape recorders.

The double deck video tape recorder system includes a first video tape recorder section 11 for, for example, the VHS system and a second video tape recorder section 21 for, for example, the 8 mm video system.

The double deck video tape recorder system further includes a mode changing over signal generating circuit 31 to which an operation input decode signal is supplied from an operation input decoding circuit 33. A remote control signal from a commander 34 for remote control is supplied to the operation input decoding circuit 33, and also a key input operation signal from a key inputting operating section 35 is supplied to the operation input decoding circuit 33. Accordingly, a mode changing over signal for putting the double deck video tape recorder system into a mode corresponding to a remote control input from the commander 34 or a key inputting operation at the key inputting operating section 35 is delivered from the mode changing over signal generating circuit 31.

An output video signal of the first video tape recorder section 11 and an output video signal of the second video tape recorder section 21 are supplied to input terminals a and b of a switch circuit 30, respectively. The switch circuit 30 is switched alternatively to the input a or b in response to a changing over signal SW from the mode changing over signal generating circuit 31 so that a selected one of the output video signals of the first and video tape recorder sections 11 and 21 is obtained from the switch circuit 30. The video signal obtained from the switch circuit 30 is led out to a monitor output terminal 32. A vide input terminal of a monitor television receiver is connected to the monitor output terminal 32.

The double deck video tape recorder system further includes a pair of input select circuits 12 and 22 for the first and second video tape recorder sections 11 and 21, respectively. A video signal from a tuner 36, an external input video signal from a line input terminal 37 and an output video signal of the second video tape recorder section 21 are inputted to the input select circuit 12. Meanwhile, a video signal from the tuner 36, an external input video signal from the line input terminal 37 and an output video signal of the first video tape recorder section 11 are inputted to the input select circuit 22. A television antenna 38 is connected to the tuner 36.

Each of the input select circuits 12 and 22 presents an input selecting condition in accordance with a mode set in response to a select signal from the mode changing over signal generating circuit 31.

Output signals of the input select circuits 12 and 22 are inputted to the recording systems not shown of the first and second video tape recorder sections 11 and 21 by way of a pair of copy guard coping processing circuits 13 and 23, respectively, each of which corresponds to the circuit 8 of the apparatus described hereinabove with reference to FIG. 1. In the present double deck video tape recorder system, the copy guard coping processing is, for example, muting processing.

The output video signals of the input select circuits 12 and 22 are supplied also to a pair of copy guard processing detecting circuits 14 and 24, respectively, which each has the same construction as the copy guard processing detecting apparatus 100 described hereinabove with reference to FIG. 1. Accordingly, when a copy guard is applied to the video signal from the input select circuit 12 or 22, this is detected by the detecting circuit 14 or 24, and such copy guard coping processing as described above such as muting is performed at the coping processing circuit 13 or 23 in accordance with the detection output DET of the detecting circuit 14 or 24. The video signal to which such copy guard coping processing has been applied is supplied to the recording system of the video tape recorder section 11 or 21. Consequently, the copy guard acts effectively. In particular, the video signal from the input select circuit 12 or 22 is muted and is not supplied to the video tape recorder section 11 or 21, and consequently, dubbing of the input signal is not performed.

In the double deck video tape recorder system of the construction described above, in any one of a case wherein the first video tape recorder section 11 is put into a reproducing condition and the second video tape recorder section 21 is put into a recording condition in order to effect so-called dubbing, another case wherein the second video tape recorder section 21 is put into a reproducing condition and the first video tape recorder section 11 is put into a recording condition in order to effect dubbing and a further case wherein a video signal obtained by reproduction with an external video tape recorder is supplied to the line input terminal in order to record the video signal with the first video tape recorder section 11 or the second video tape recorder section 21 to effect dubbing, the detecting circuit 14 or 24 can detect accurately with certainty whether or not a copy guard is applied to the reproduced video signal. In accordance with the detection output of the detecting circuit 14 or 24, copy guard coping processing such as muting, attenuation of the recording level, stopping of recording or digital mosaic processing is performed appropriately.

It is to be noted that, while, in the double deck video tape recorder system described above, a copy guard processing detecting circuit and a copy guard coping processing circuit are provided at the input stage of the recording system of each of the video tape recorder sections, the copy guard processing detecting circuit and the copy guard coping processing circuit may otherwise be provided at the output stage of the reproducing system of each video tape recorder section such that, when dubbing is to be performed between the first video tape recorder section and the second video tape recorder section, the copy guard processing detecting circuit of that one of the video tape recorder sections which is to be put into a reproducing condition is enabled.

It is to be noted that, while the foregoing relates to copy guard processing for a video signal which involves insertion of one or a plurality of pairs of pulses each including a false synchronizing pulse and a positive pulse as a copy guard signal into a vertical blanking interval, the copy guard processing as an object of the present invention is not limited to such specific processing but can be applied to any video signal which includes a plurality of false synchronizing pulses in a vertical blanking interval thereof.

Having now fully described the invention, it will be apparent to one of ordinary skill in the art that many changes and modifications can be made thereto without departing from the spirit and scope of the invention as set forth herein.

What is claimed is:

1. A copy guard processing detecting apparatus, comprising:
    first means for receiving an input video signal which includes a plurality of false synchronizing signals for prevention of duplication inserted in a vertical blanking interval thereof and for counting the number of the false synchronizing signals;
    second means for counting the number of synchronizing signals in an image interval of the input video signal except the vertical blanking interval; and
    discriminating means for discriminating whether or not copy guard processing is applied to the input video signal from the count values of said first and second means.

2. A copy guard processing detecting apparatus according to claim 1, wherein said discriminating means includes a time constant circuit for detecting that the condition wherein copy guard processing is applied to the input video signal continues for a predetermined period of time.

3. A copy guard processing detecting apparatus according to claim 1, wherein said discriminating means discriminates that copy guard processing is applied to the input video signal when the count value of said first means is greater than the sum of a predetermined number of false synchronizing signals which must be included in the vertical blanking interval and a margin value.

4. A copy guard processing detecting apparatus according to claim 1, wherein said discriminating means discriminates that the input video signal includes no noise therein when the count value of said second means is greater than the difference of a margin value from a predetermined number of synchronizing signals which are to be included in the image interval but is smaller than the sum of the margin value and the predetermined number.

* * * * *